United States Patent [19]

Whitelaw

[11] Patent Number: 4,732,555

[45] Date of Patent: Mar. 22, 1988

[54] TILE MAKING APPARATUS

[76] Inventor: Thomas W. Whitelaw, 127 Latrobe Parade, Dromana, Victoria, Australia

[21] Appl. No.: 912,600

[22] PCT Filed: Dec. 11, 1985

[86] PCT No.: PCT/AU85/00313

§ 371 Date: Aug. 11, 1986

§ 102(e) Date: Aug. 11, 1986

[87] PCT Pub. No.: WO86/03448

PCT Pub. Date: Jun. 19, 1986

[30] Foreign Application Priority Data

Dec. 11, 1984 [AU] Australia .............................. PG8518

[51] Int. Cl.⁴ .............................................. B29C 39/04

[52] U.S. Cl. .................................... 425/218; 425/253; 425/308; 425/310; 425/385; 425/446

[58] Field of Search ............... 425/218, 224, 259, 253, 425/254, 307, 308, 310, 418, 427, 447, 456, 385, 446

[56] References Cited

U.S. PATENT DOCUMENTS

| | | | |
|---|---|---|---|
| 1,245,432 | 11/1917 | Brown | 425/307 |
| 1,954,635 | 4/1934 | Leonard | 425/194 |
| 2,949,634 | 8/1960 | Shipley | 425/194 |
| 3,257,701 | 6/1966 | Lang | 425/253 |
| 3,677,686 | 7/1972 | Powel | 425/553 |
| 3,824,055 | 7/1974 | Shoe et al. | 425/218 |
| 3,910,711 | 10/1975 | Moorhead | 425/385 |
| 4,125,348 | 11/1978 | Martens | 425/385 |
| 4,386,694 | 6/1983 | Van Heel et al. | 425/253 |

FOREIGN PATENT DOCUMENTS

| | | |
|---|---|---|
| 400429 | 10/1933 | United Kingdom . |
| 1577321 | 10/1980 | United Kingdom . |
| 2070503 | 9/1981 | United Kingdom . |

*Primary Examiner*—Willard E. Hoag
*Attorney, Agent, or Firm*—Wolf, Greenfield & Sacks

[57] ABSTRACT

Means for moving a mold train or a support to filling means and roll means to smooth the surface of the material in molds of the train. The roll has a cutter which cooperates with the edge of the mold to break the continuous mold material at the junction between abutting molds and means to separate end molds from the train.

5 Claims, 9 Drawing Figures

FIG 4
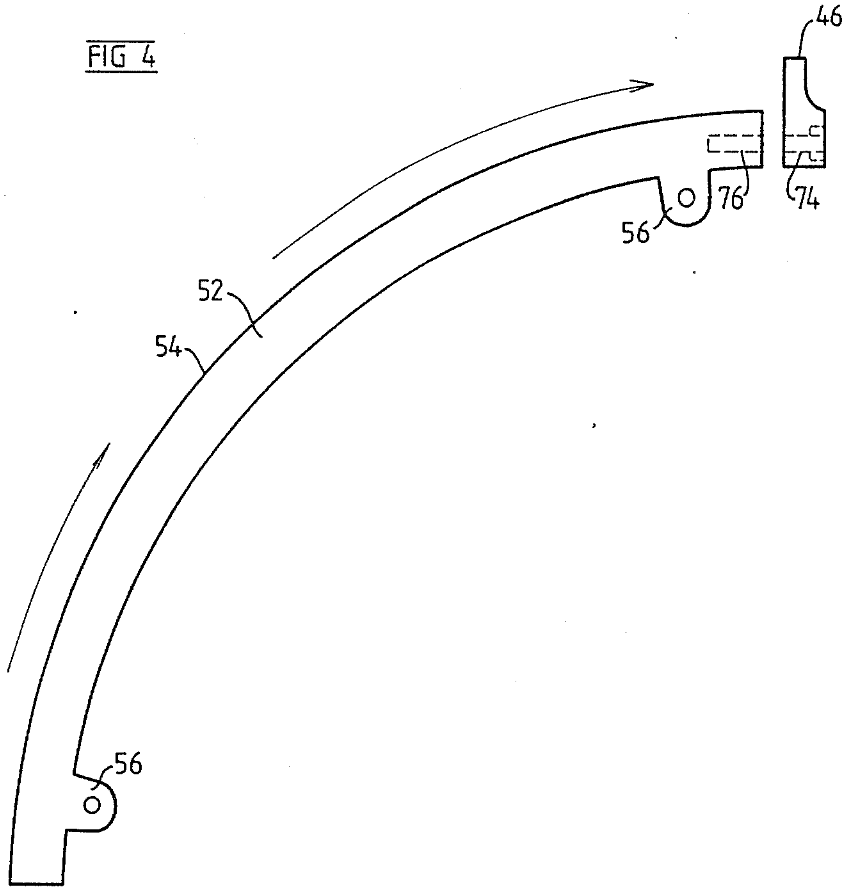
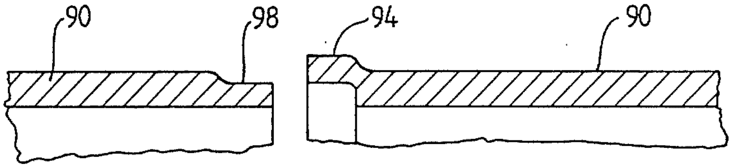
FIG 8

TILE MAKING APPARATUS

This invention relates to a tile making apparatus and method. The invention is particularly but not exclusively applicable for making roof tiles from cement or cement based materials. The invention also has application in the making of terra cotta tiles.

According to the present invention there is provided apparatus for forming articles from hardenable material, said apparatus comprising a support bed for supporting a plurality of molds which in use are driven therealong, depositing means for depositing a layer of hardenable material on the molds, and forming means having a forming or forming surfaces thereon for shaping the upper face of the layer, said forming means being constrained to move in synchronism with the molds whereby there is substantially no relative velocity in the direction of movement of the molds between the forming surface or forming surfaces and the layer at the region of contact therebetween.

Preferably the apparatus is arranged for forming cement tiles in which case the molds comprise metal pallets which are fed in a continuous line along the bed. It is preferred that the forming means is in the form of a drum having the forming surface or surfaces thereon on the cylindrical surface of the drum. The drum is driven by the same drive mechanism which drives the pallets whereby it is kept in synchronism therewith.

Preferably further, the forming means includes projections which separate tiles being formed on the individual pallets. This eliminates the need for a separate cutting mechanism such as a pneumatically operated guillotine.

Preferably further, the depositing means includes a hopper and a screed for shaping approximately the layer to the form of the tile to be produced. The screed may simply comprise a plate or plate-like member extending in a generally upright plane at the outlet orifice of the hopper. In known continuous tile making machines it is necessary to have a slipper plate at the outlet orifice of the storage bin. The slipper plate compresses and forms the upper profile of the tile. The action of the slipper plate compresses the cement considerably and accordingly it considerably increases the force required to drive the pallets. In accordance with the preferred arrangement of the invention, the slipper plate is eliminated and the forming means has no relative velocity to the cement being formed and therefore considerably less force is required to drive the pallets.

Where the invention is used for forming terra cotta tiles, the molds take the form of dies which are mounted on a conveyor line. After forming of the upper surfaces of the clay the formed tile is separated from its die and transferred to a wooden pallet.

The invention will now be further described with reference to the accompanying drawings, in which:

FIG. 4 is a side view of one of the forming mmembers;

FIG. 8 shows a modified arrangement for producing ridge tiles with a raised capping.

Figure 1:
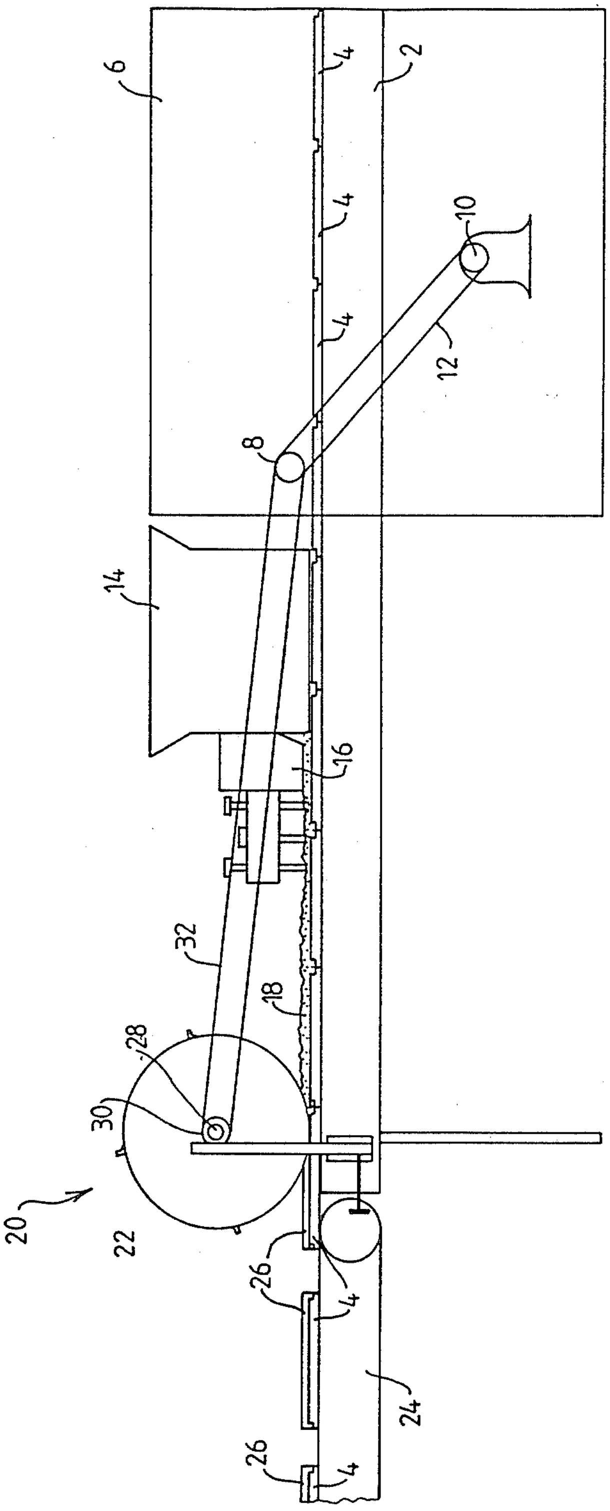
FIG. 1 is a schematic side view of an apparatus for forming cement tiles in accordance with the invention.

The apparatus shown in FIG. 1 comprises a bed 2 along which is driven a stream of pallets 4. The apparatus includes a drive mechanism 6 which drives the pallets 4 along the bed in a continuous line. The drive mechanism 6 is preferably of the type disclosed in U.S. Pat. No. 4,386,694. As diagrammatically illustrated in FIG. 1, the drive mechanism 6 includes a sprocket 8 which is coupled to a drive sprocket 10 by a chain 12.

The pallets 4 pass beneath a cement hopper 14 having a screed plate 16 at its outlet. The screed 16 deposits a layer 18 of cement on the pallets 4. The pallets then pass to a forming zone 20 which includes a forming roller 22 which compresses and forms the upper surface of the tiles.

After the forming zone 20, the pallets engage a conveyor 24 for conveying the pallets and formed tiles 26 to a racking system (not shown) for curing.

The drum 22 is mounted upon a shaft 28 which carries a sprocket 30 which is coupled to the sprocket 8 by means of a chain 32. This drive arrangement ensures that the pallets are driven synchronously with the drum 22 regardless of the speed at which the driving mechanism 6 operates.

Figure 2:
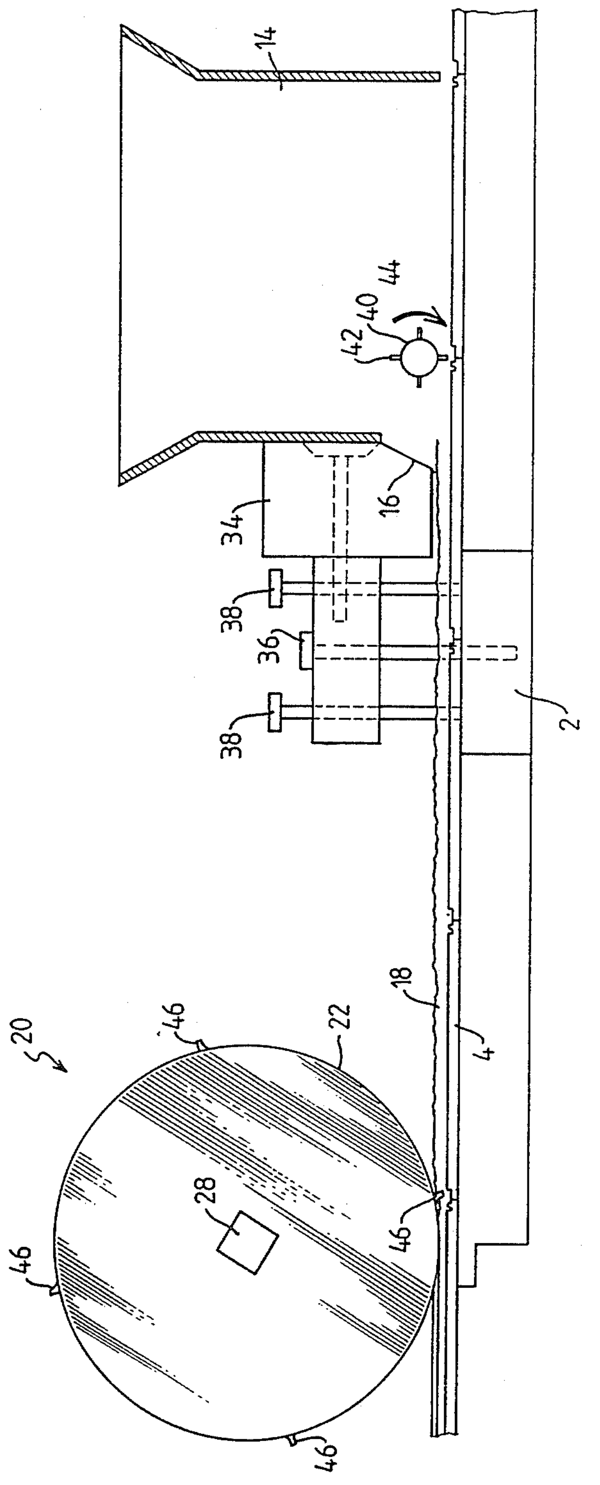
FIG. 2 is a more detailed schematic view of part of the apparatus shown in FIG. 1.

Referring now to FIG. 2, it will be seen that the screed 16 is mounted on a support plate 34 which is in turn mounted on a bar 36. The position of the bar 36 relative to the bed 2 can be adjusted by means of adjusting bolts 38 whereby the thickness of the layer 18 of cement passing beneath the screed plate 16 can be adjusted. It will be further observed that the screed plate 16 is obliquely mounted relative to the vertical. Further, the lower edge of the screed plate 16 is preferably chisel shaped and further has a profile which corresponds to the top surface of the tile to be formed. This ensures that the layer 18 has the general configuration of the tile prior to entry into the forming zone 20. Located within the hopper 14 is a feeding roller 40 formed with projecting pins 42. The roller 40 is rotated in the direction of arrow 44 so as to assist in uniform feed of cement to the screed plate 16. Further, the roller has the same general configuration (when viewed from the side) as the top surface of the tile to be formed. It will be further seen from FIG. 2 that the forming surface 22 is provided with a plurality of projecting lugs 46 which serve to form and separate the tiles 26 on the pallets 4.

Figure 3:
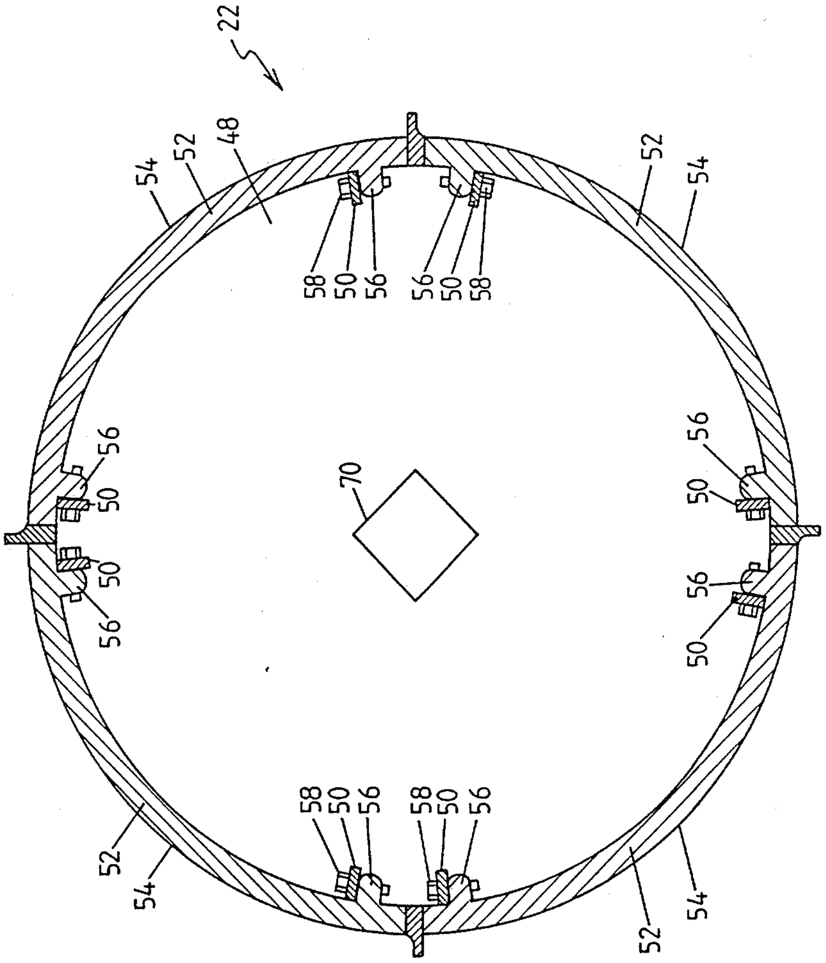
FIG. 3 is a transverse cross section through the forming drum.
Figure 5:
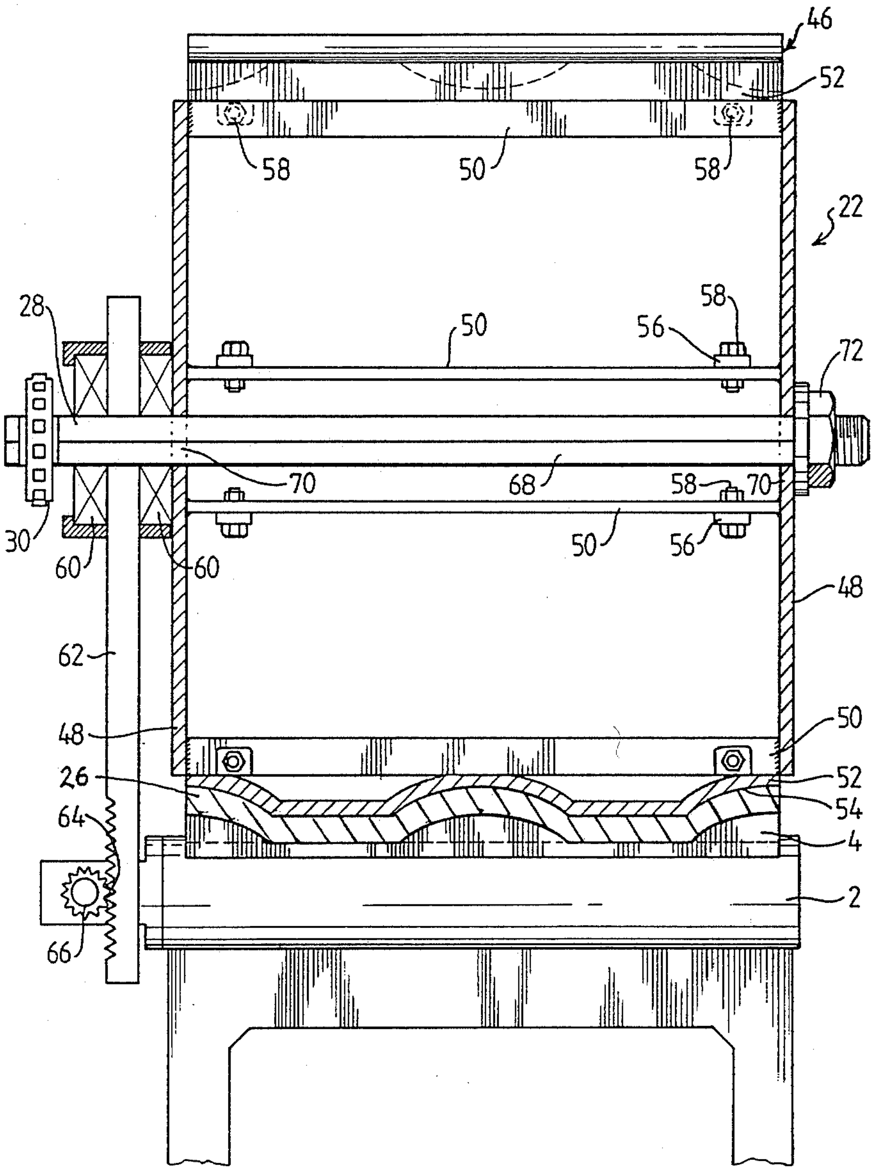
FIG. 5 is a transverse section through the apparatus.

FIGS. 3, 4 and 5 illustrate the forming drum 22 in greater detail. The drum comprises a pair of side plates 48 which are connected together by connecting bars 50. The bars 50 serve to mount curved forming members 52, the outer peripherys 54 of which have a profile which corresponds to the shape of the top surface of the tile to be formed, as best seen in FIG. 5. The undersides of the forming members 52 are provided with mounting lugs 56 whereby the members 52 can be connected to the bars 50 by bolts 58. The drum 22 is mounted on the shaft 28 by means of a pair of robust bearings 60 carried on a support post 62. The lower end of the support post is adjustably mounted relative to the bed 2 by means of a worm formation 64 which meshes with a worm wheel 66. Other guide means (not shown) may be provided adjacent to the post 62 for supporting the bearings 60. The use of the worm and worm wheel enables the height of the shaft 28 to be adjusted relative to the bed 2 which is useful where tiles of different shapes are being formed. The shaft 28 includes a central portion 68 of square cross section. The central portion passes through complementary openings 70 in the side plates 48 so that the drum is rotated with the shaft. The drum is held on the shaft by means of a large nut 72 mounted on the free end of the shaft. This arrangement has the advantage that the drum can be removed and replaced quickly by a different drum having forming elements for forming tiles of a different configuration. The lugs 46 are made detachable from the forming elements 52 and can be mounted thereon by means of bolts (not shown) which pass through bores 74 in the lugs 46 and are received within threaded bores 76 in the members 52. It will be appreciated that the length L is the same as the length of the tile formed on each of the pallets 4. In the illustrated arrangement, the drum has four elements 52 but of course drums with other numbers of elements would be feasible.

Figure 6:
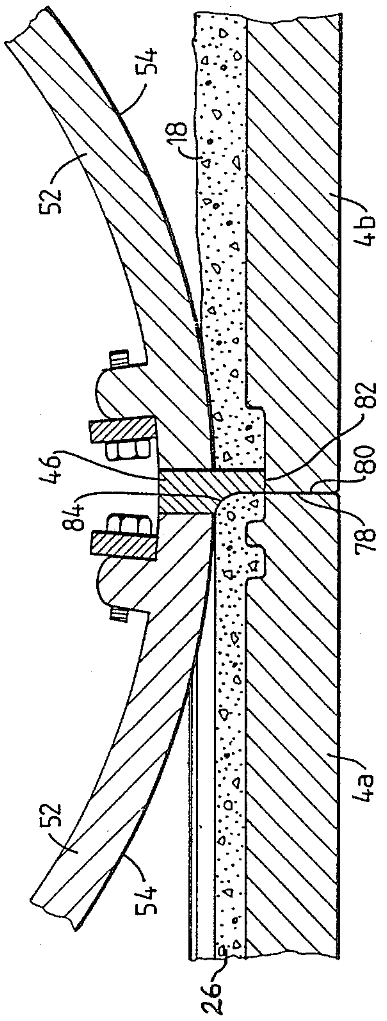
FIG. 6 shows the forming drum forming the top surface at the junction of a pair of tiles.
Figure 7:
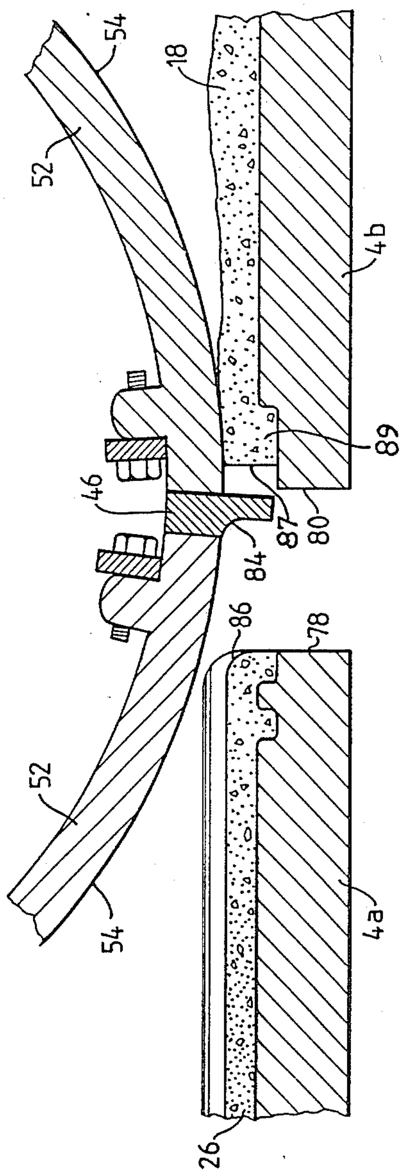
FIG. 7 shows the formed tiles being separated.

FIGS. 6 and 7 illustrate in greater detail the manner in which the forming drum 22 co-operates with the layer 18 and the pallets. In FIG. 6, the trailing edge 78 of a downstream pallet 4*a* abuts the leading edge 80 of an upstream pallet 4*b*. The drive mechanism 6 is arranged so that the lug 46 coincides with the junction of the edges 78 and 80. In this way the lower edge 82 of the junction 46 separates the layer of cement onto the individual pallets in order to form the uncured tiles 26. It will be further observed that the lugs 46 include a concave forming surface 84 which produces a rounded nose 86 on the trailing edge of the tile 26 which has been formed on the pallets. This given an attractive appearance to the tile and moreover assists in providing a clearance between the lug 46 and the trailing edge of the tile after separation has occurred. The lug 46 also helps shape the face 87 of the batten lug 89 of the downstream tile being formed. It is also desirable to operate the conveyor 24 at a higher speed relative to the drive mechanism 6 so that the pallets which are engaged thereon and move quickly away from the lugs 46 after the lugs have effected separation of the formed tiles. For instance, where the lug 46 projects from the forming surface 54 by say 22 mm, it is convenient to arrange for the drive speed of the conveyor 24 to be 8% faster than the speed at which the pallets are driven along the bed 2. Typically the pallets travel on the bed at from say 40 meters per minute to 46 meters per minute.

It is expected that the apparatus of the invention will be useful with a normal cement mixture which is used for manufacturing cement roofing tiles. It is further expected however that the invention will also be useful with light weight concrete which before curing has a foamy texture and in the past has not been suitable for forming extruded tiles because the material tends to stick to the slipper plate which is located at the outlet of the cement bin 14. In the present apparatus, the slipper plate is eliminated and an inclined screed plate 16 is employed to provide the rough profile for the layer 18. Thereafter, the final forming takes place by contact with the rotatable drum 22 which has no relative velocity between the layer 18 at the contact point between the surfaces 54 and the layer. Accordingly the apparatus will handle light weight cement. When the apparatus is operated with cement of normal consistency, the thickness of the tile is generally about 16 mm. In this instance, it is convenient to arrange for the lower edge of the screed plate to be adjusted so that it deposits the layer 18 19 mm thick. In the case of light weight concrete for forming tiles of the same final thickness, the layer 18 should be deposited about 25 mm in thickness.

FIG. 8 shows the apparatus of the invention operating with a drum 22 having forming members 88 mounted thereon which are appropriate for forming ridge tiles 90. The arrangement is such that the forming members 88 include recesses 92 adjacent to the lugs 46 which recesses form raised collar portions 94 on the ridge tiles. Projecting portions 96 on the members 88 produce rebates 98 on the trailing edges of the ridges tiles 90.

Figure 9:
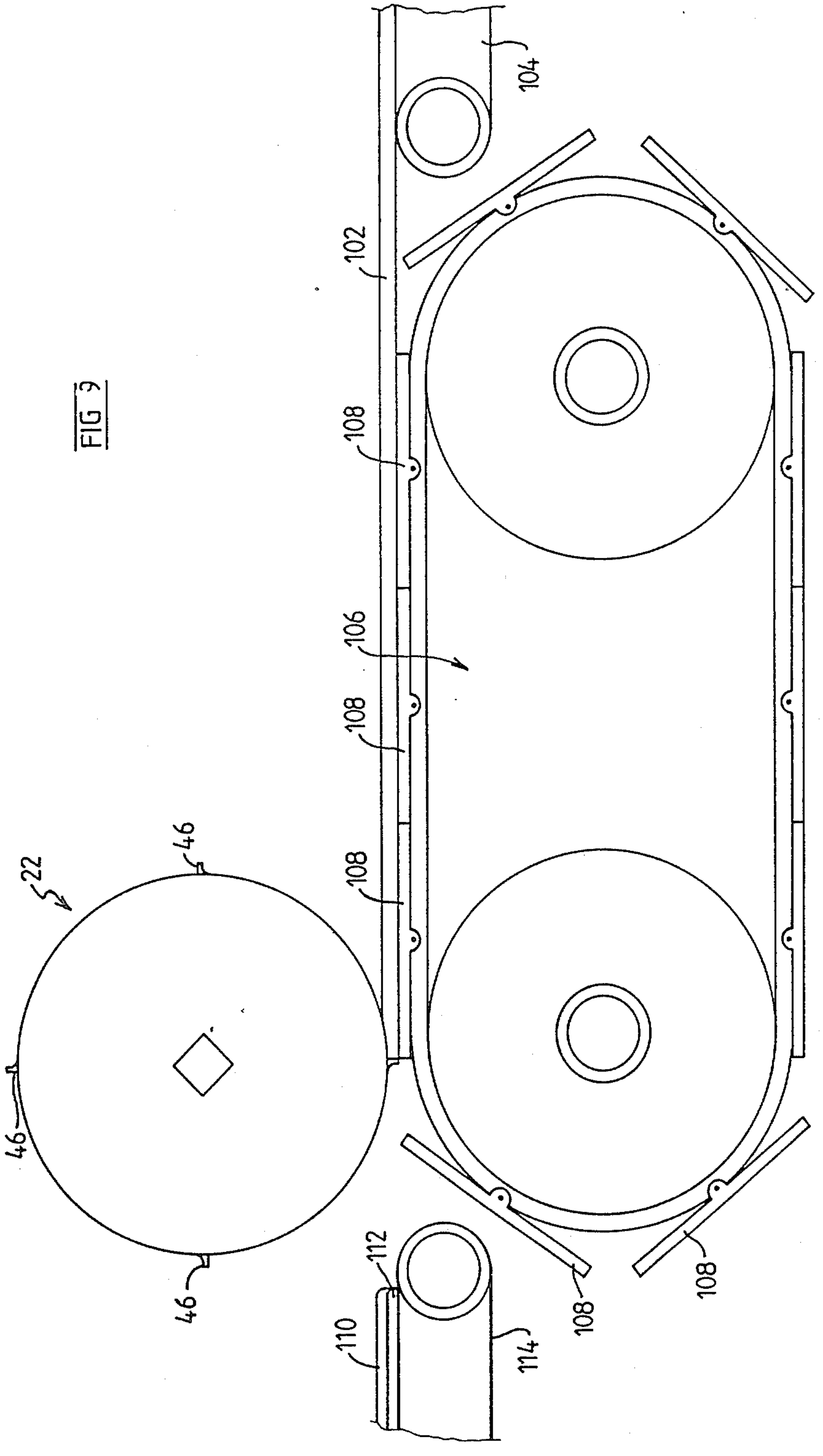
FIG. 9 is a schematic side view of an apparatus for forming terra cotta tiles.

FIG. 9 schematically illustrates how an apparatus embodying the principles of the invention can be modified so as to form terra cotta tiles. In this arrangement 100 a layer of clay which is in a plastic state and in the form of a ribbon 102 is carried by a conveyor 104 to a conveyor 106 having a plurality of dies 108 pivotally connected thereto. The dies 108 thus carry the ribbon 102 to the forming drum 22 which shapes the upper profile of the layer formed by ribbon 102 and thus forms clay tiles 110. The tiles 110 are removed from the dies 108 and are transferred to pallets 112 upon which the tiles are dried prior to firing. The lugs 46 operate in a manner which is analogous to that described with reference to FIGS. 6 and 7. It is envisaged that the apparatus shown in FIG. 9 will enable production of terra cotta tiles at a much faster rate than is possible at present because continuous extrusion of roofing tiles in terra cotta clay cannot be carried out satisfactorily.

Many modifications will be apparent to those skilled in the art without departing from the spirit and scope of the invention.

I claim:

1. Apparatus for forming tiles from hardenable material, comprising (i) a support bed for supporting a moving train of abutting molds which are driven therealong;

(ii) feed means for depositing a continuous layer of the tile material in the unhardened state on the molds;

(iii) a drum, the peripheral surface of the drum being contoured to shape the upper surface of the unhardened material carried by the molds as the drum turns;

(iv) drum support means, the drum being disposed over the support bed downstream of the feed means;

(v) drive means for rotating the drum at a peripheral speed that matches the speed of the moving train of molds whereby there is substantially no relative velocity in the direction of movement of the molds between the layer of tile material and the contiguous peripheral surface of the rotating drum;

(vi) partition means on the drum for breaking the continuous layer of tile material at the junction between the abutting molds at the forward end of the train; and (vii) means situated ahead of the train for moving the formost mold away from the train upon the breaking of the continuous layer.

2. Apparatus according to claim 1, wherein the drum support means includes means for adjusting the height of the drum relative to the support bed to cause the drum's peripheral surface to contact the upper surface of the layer of material as the drum turns.

3. Apparatus according to claim 1, wherein the drum support means includes (a) a support member extending upwardly at one side of the support bed,
(b) a cantilever shaft carried by the support member and extending over the support bed, and
(c) means on the cantilever shaft carrying the drum.

4. Apparatus according to claim 3, wherein
the peripheral surface of the drum is comprised of curved plates having the partition means interposed between contiguous plates.

5. Apparatus according to claim 4, wherein
the partition means is contoured to form a curved nose portion on the tile.

* * * * *